H. H. FEHRENSCHILD.
TEMPERATURE CONTROL DEVICE.
APPLICATION FILED FEB. 18, 1916.
1,204,262.
Patented Nov. 7, 1916.
2 SHEETS—SHEET 1.
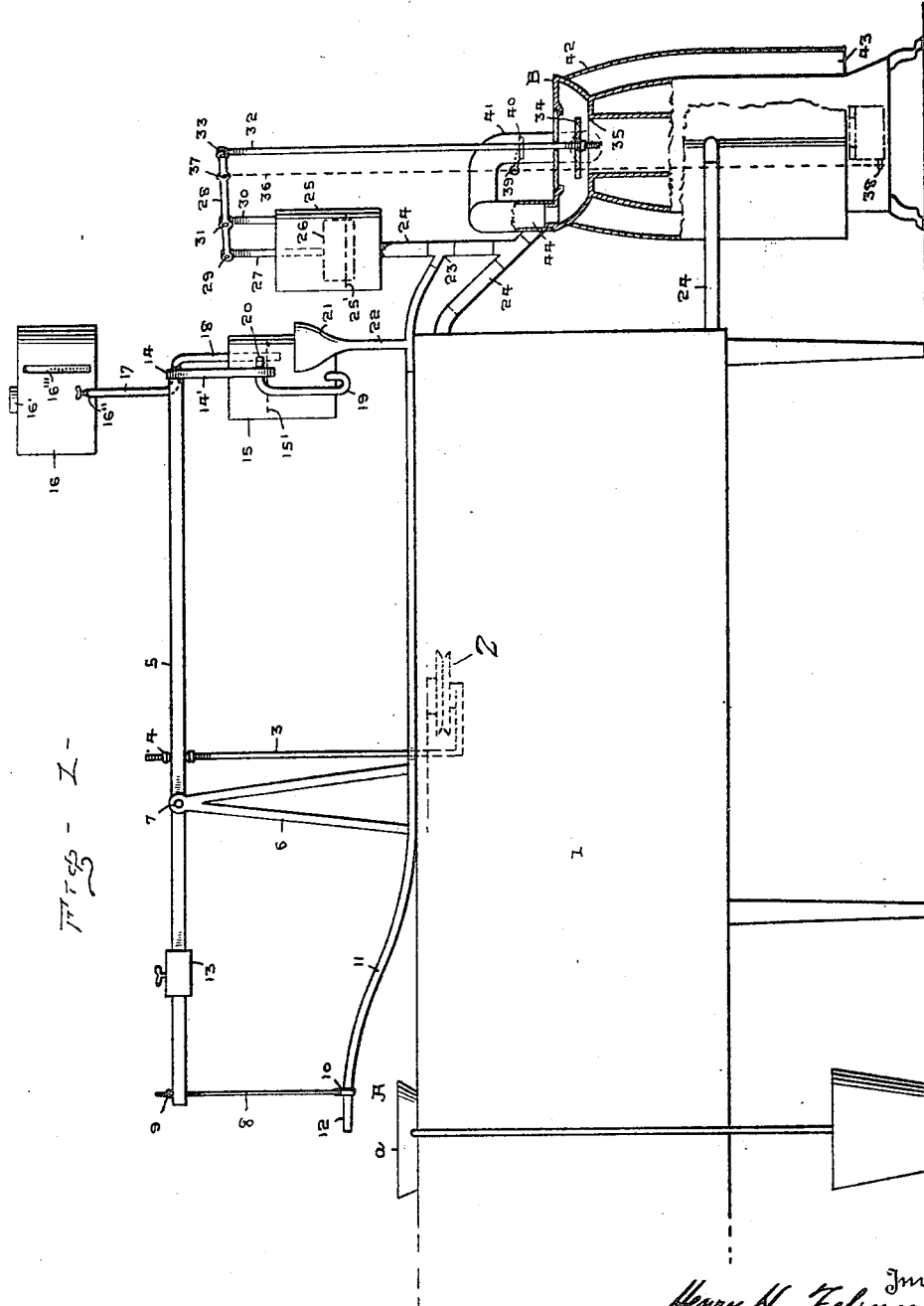

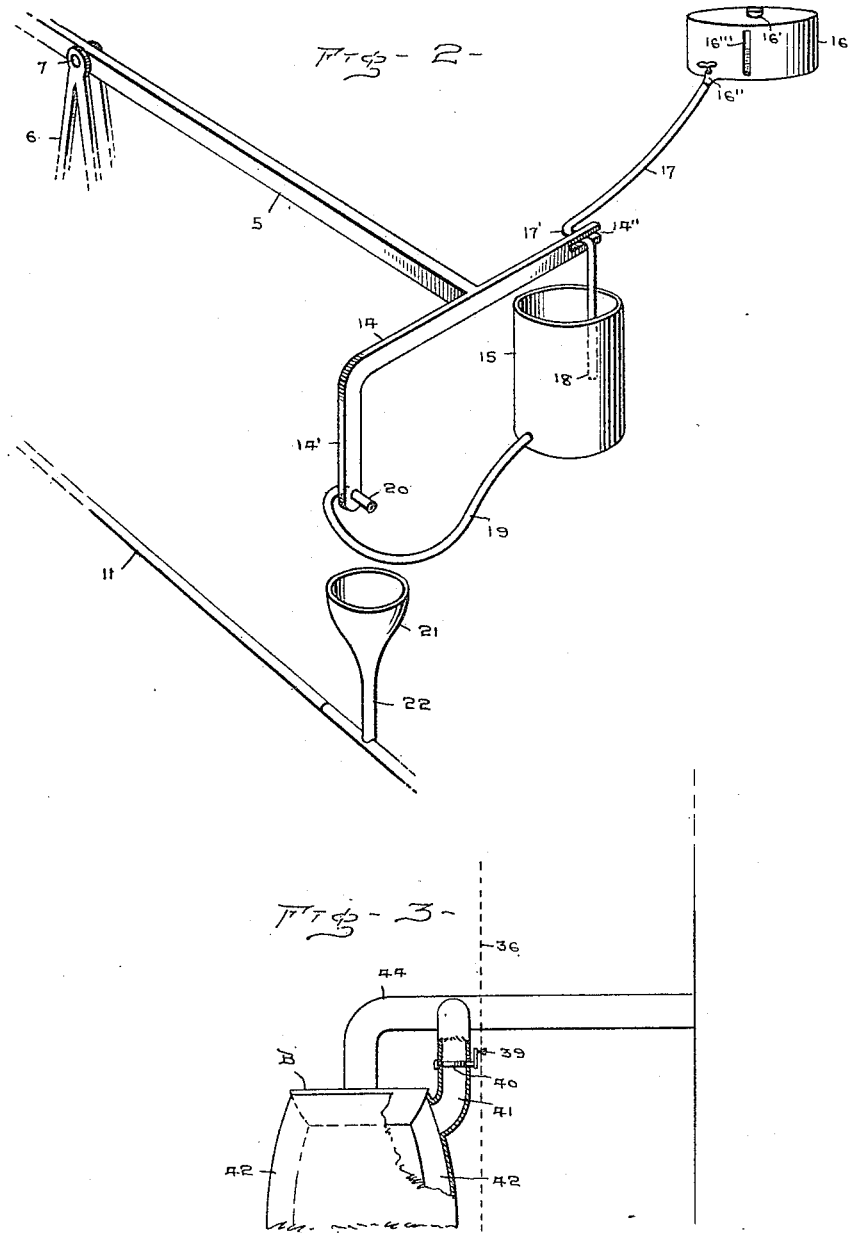

UNITED STATES PATENT OFFICE.

HENRY H. FEHRENSCHILD, OF RIVERVALE, NEW JERSEY.

TEMPERATURE-CONTROL DEVICE.

1,204,262.   Specification of Letters Patent.   Patented Nov. 7, 1916.

Application filed February 18, 1916. Serial No. 79,064.

*To all whom it may concern:*

Be it known that I, HENRY H. FEHRENSCHILD, a citizen of the United States, residing at Rivervale, in the county of Bergen and State of New Jersey, have invented certain new and useful Improvements in Temperature-Control Devices, of which the following is a specification.

My invention consists in a new and useful improvement in temperature control devices, and is especially adapted for use in connection with incubators and brooders and such devices as require a fixed temperature to be maintained constant for long periods of time.

While I have designed my device for this specific purpose, I do not wish to be limited in the use of my invention to this purpose, but claim its use in connection with any and all devices for varying temperature, by whatsoever means and for whatsoever purpose.

My invention comprises an apparatus whereby the source of heat, used in connection with the hot water circulating systems commonly used upon certain types of incubators and brooders, is controlled by the operation of dampers and draft controls upon the heater.

The novel feature of my device consists in the combination of the action of a thermostatic device, of any well known type, with a liquid pressure device of novel construction, to secure the operation of the controlling devices upon the heater.

As a distinctly novel feature of the device, I have included an air jacket surrounding the circulating water system in the heater, for use in cooling the circulating water, when it is desirable to check the rising temperature. Experience has shown me that this feature is most essential to the successful operation of the device, particularly in times and places when and where the prevailing average temperature is high. This cooling jacket is adapted to be connected with the operation of the system when required and is also adapted to be disconnected from the system, so that, when the circulation of air therein is prevented, it will serve as an additional means for increasing the efficiency of the heating system.

My invention consists in the details of construction hereinafter pointed out.

In the drawings: Figure 1 is a side view, partly in section, of an incubator provided with the device embodying the invention. Fig. 2 is a perspective view of a portion of one end of the device. Fig. 3 is an end view, partly in section, of a portion of the heater and parts of the device connected therewith.

In the drawings: numeral 1 designates an incubator of the usual type, in the upper part of which, directly beneath the heating system, is located the thermostat 2, of any ordinary type, provided with the operating rod 3, adapted to be lowered by the action of high temperature upon the thermostat, and correspondingly raised by the action of low temperature upon the thermostat. By means of the connection 4, the rod 3 is adjustably and pivotally connected with the balance beam 5, which is supported upon the standard 6, in the pivot bearing 7. At one end of the balance beam 5, there is the depending rod 8, fixed to the beam 5 in the pivot bearing 9. At the lower end of the rod 8, there is the collar 10, carrying therein the tube 11, whose open end 12 is immediately adjoining the collar 10 and located above the drip pan *a* of the drainage system A. On the beam 5, between the pivot bearing 7 and the pivot bearing 9, is the sliding weight 13, for adjustment of the balance beam 5. At the end of the beam 5, opposite to the pivot bearing 9 is the cross-arm 14, mounted at right angles to the beam 5 and having at one of its ends the depending portion 14' and at its other end the slotted portion 14''. Located beneath the slotted portion 14'', and mounted upon the top of the incubator 1, is the supply tank 15, containing water, at a varying level 15'. Mounted at a point above the level of the beam 5 and conveniently situated with respect to the supply tank 15, is the air-tight tank 16, provided with the inlet tap 16', the outlet valve 16'', and the contents' indicator 16'''. Connected with the outlet valve 16'' is the tube 17, provided with a rigid portion 17' adapted to be held slidably in the slotted portion 14'' of the cross arm 14, so that the depending lower end 18 of the tube 17 shall be disposed within the supply tank 15. From the bottom of the supply tank 15, extends the flexible tube 19, having its open end 20 held in the lower end of the depending portion 14' of the cross-arm 14. The open ends 18 and 20 of the tubes 17 and 19 are constantly level being at a fixed point below the beam 5. Directly below the open end 20 of the tube 19, is located the drip cup 21, which is provided with the tube 22 leading therefrom. The tube 22 is connected with the tube 11, whose end 23 is connected with the pipe 24 of the circulating water system connected with the heater. Attached to this pipe 24 is the expansion tank 25, containing water at a varying level 25′, and adapted so that this varying level 25′ is constantly below the line of the bottom of the supply tank 15. Within the expansion tank 25, carried upon the water therein, is the float 26 from which extends upwardly the rod 27, which is connected with the rod 28 in the pivot bearing 29. The rod 28 is mounted upon the standard 30 in the pivot bearing 31, and connected to the depending rod 32 in the pivot bearing 33. The rod 32 extends into the heater B and is provided with the damper 34, adapted to coact with the damper seat 35 of the heater B. Extending downwardly from the rod 28 is the chain or rod 36 attached thereto in the pivot bearing 37 and adapted to operate the lower draft door 38 of the heater B. Attached to the chain or rod 36 is the finger 39 adapted to operate the damper 40 pivotally mounted within the flue 41 leading from the cooling air jacket 42, which surrounds the heater B and is provided with an air inlet 43, at its bottom. The flue 41 is connected at its upper end with the flue 44 of the heater B.

Operation: The device operates as follows. The device being in the position indicated in Fig. 1, the volume of water in the circulating system is such that the expansion tank 25 contains sufficient water to maintain the water level 25′ at a point to support the float 26 so that the attachments thereto, rods 27, 28 and 32 hold the damper 34 above the damper seat 35 and hold the lower draft door 38 open and the damper 40 closed in the flue 41 of the cooling system. At the same time, the volume of water in the circulating system keeps the tube 11 full of water, the open end 12 being held by the adjustment of the beam 5 at a point above the level of the water level 25′ in the expansion tank 25. The water in the supply tank 15 is sufficient in volume to rise above the open end 18 of the pipe 17 so that the water from the air-tight tank 16 completely fills the tube 17, the inlet tap 16′ being closed and the outlet valve 16″ being open, the column of water in the tube 17 between the water level 15′ in the tank 15 and the tank 16, remaining stable. The open end 20 of the pipe 19 is above the water level 15′. Such relation of the parts exists when the beam 5 is horizontally disposed, the thermostat 2 and its connected operating rod 3 being in normal position. The heater B being in position for increasing the heat distributed by the circulating water system, the temperature in the incubator increases. The rod 3 being properly adjusted in relation to the beam 5, so that temperature, above a certain predetermined degree, actuating the thermostat, it will operate the beam 5 when such a degree of heat is attained in the incubator, the thermostat 2 operating lowers the rod 3 which lowers the portion of the beam 5 between the bearing 7 and the cross-arm 14. The cross-bar 14 carries the open end 20 of the tube 19 to a point below the water level 15′, thus allowing the water to flow from the tank 15 through the tube 19, discharging from the open end 20 thereof into the drip cup 21, whence it flows through the pipes 22, 11 and 24, thus increasing the volume of water in the circulating system and consequently in the expansion tank 25, raising the water level 25′ and by it the float 26 and thereby closing the damper 34 upon the damper seat 35, closing the lower draft door 38 and opening the damper 40 in the flue 41, thereby causing a cooling draft in the cooling jacket 42 through the opening 43. The whole process tends to check the action of the heater B and thus lower the temperature of the water in the circulating system and consequently the temperature in the incubator. Should the action above outlined result in so checking the heat distributed by the circulating system as to lower the temperature in the incubator below the desired temperature, the adjustment of the thermostat 2 is such that the rod 3 will rise until the portion of the beam 5 between the bearing 7 and the bearing 9 is lowered so that the movement lowers the rod 8 and the collar 10 carrying the open end 12 of the tube 11 to a point below the water level 25′ in the expansion tank 25, thus allowing water to draw off through the tube 11 and its open end 12, into the drip pan a of the drainage system A, thus reducing the volume of water in the circulating system and consequently in the expansion tank 25 so that the water level 25′ is lowered and with it the float 26, thereby opening the damper 34 above the damper seat 35, opening the lower draft door 38 and closing the damper 40 in the flue 41, and so adjusting the parts of the heater B to increase the heat and raise the temperature of the circulating water system and thereby raise the temperature in the incubator. The movement of the beam 5, which resulted in draining water through the pipe 11, by lowering the end 12, at the same time resulted in raising the cross-bar 14 and with it the open end 18 of the pipe 17, to a point above the water line 15′. When this occurs, the column of water in the pipe 17, having no longer support from the water in the supply tank 15, is permitted to flow into the tank 15, thereby raising the water level 15′ until it reaches a point level with the open end 18 of the tube 17, thus checking the flow and restoring the former condition of the column of water in the tube 17. This process serves to supply the volume of water in the supply tank 15 which was reduced by the former operation of the device to supply a greater volume of water in the circulating system.

Having described my invention, what I claim is:

1. The combination in a temperature control device, of a thermostatic device provided with a movable member; a balance beam; a rod connecting the said movable member and the said balance beam; a conduit pipe carried by the said balance beam and connected with a supply tank containing water and adapted to supply such water by the movement of the balance beam and conduit to an expansion tank; an expansion tank, provided with a movable member operated by the water supplied by the conduit pipe; and means of temperature variation, adapted to be controlled by the action of said movable member.

2. The combination in a temperature control device, of a thermostatic device provided with a movable member; a balance beam; a rod connecting the said movable member and the said balance beam; a conduit pipe carried by the said balance beam and connected with a supply tank containing water and adapted to supply such water by the movement of the balance beam and conduit pipe to an expansion tank; an expansion tank provided with a float operated by the water supplied by the conduit pipe; rods adapted to be operated by the action of the float; and a heater provided with draft dampers operated by said rods.

3. The combination, in a temperature control device, of a thermostatic device provided with a movable member actuated by variations in temperature; a balance beam operated by such member and provided at one end with a crossing arm carrying two water conduits the ends of which are equi-distant from the end of the balance beam; an air-tight water tank connected with one conduit, the open end of which conduit is disposed in a supply tank from the bottom of which supply tank extends the other conduit carried by the arm of the balance beam; a drip cup adapted to catch the water issuing from the open end of the second conduit and provided with a conduit connected with an expansion tank which is connected with a hot water circulating system and provided with a waste pipe, the end of which is connected with the end of the balance beam opposite to the end provided with the arm; a float in the expansion tank actuated by the expansion and contraction of the water in the system, and connecting means for affecting by the action of such float the heating means used in connection with the hot water circulating system.

4. The combination, in a temperature control device, of a thermostatic device provided with a movable member actuated by variations in temperature; a balance beam operated by such member and provided at one end with a crossing arm carrying two water conduits, the ends of which conduits are equi-distant from the end of the balance beam; an air-tight water tank connected with one conduit, the open end of which conduit is disposed in a supply tank from the bottom of which supply tank extends the other conduit carried by the arm of the balance beam; a drip cup adapted to catch the water issuing from the open end of the second conduit and provided with a conduit connected with an expansion tank which is connected with a hot water circulating system and provided with a waste pipe, the end of which is connected with the end of the balance beam opposite to the end provided with the arm; a float in the expansion tank actuated by the expansion and contraction of the water in the system; and a heater provided with a damper and a lower draft door having connections with the float in the expansion tank adapted to operate the damper and lower draft door to open and close the draft through the heater, and provided further with a cooling jacket surrounding the circulating water system of the heater and having a draft flue provided with a damper having a connection with the float in the expansion tank adapted to open and close the draft through the cooling jacket.

In testimony whereof I affix my signature in the presence of two witnesses.

HENRY H. FEHRENSCHILD.

Witnesses:
 JOHN E. HARING,
 HARRY THURNALL.

Copies of this patent may be obtained for five cents each, by addressing the "Commissioner of Patents, Washington, D. C."